United States Patent [19]

Williams

[11] 4,456,414
[45] Jun. 26, 1984

[54] QUICK COUPLING APPARATUS FOR INTERCHANGEABLE TRUCK BODIES

[75] Inventor: Floyd G. Williams, Naturita, Colo.

[73] Assignee: Kybato, Inc., Naturita, Colo.

[21] Appl. No.: 344,833

[22] Filed: Feb. 1, 1982

[51] Int. Cl.³ .................... B60P 1/64; B63B 25/20
[52] U.S. Cl. .................... 410/80; 403/361; 403/375; 410/77
[58] Field of Search .......... 410/80, 77, 78, 81, 410/84, 68, 69, 71, 72, 73, 76, 79, 90; 296/35.1, 35.3; 292/106; 403/353, 375, 361

[56] References Cited

U.S. PATENT DOCUMENTS 3,043,411 7/1962 Wyrough ............... 403/353
3,374,030 3/1968 Brisebois ............... 410/80

Primary Examiner—David A. Scherbel
Assistant Examiner—Glenn Foster
Attorney, Agent, or Firm—James E. Pittenger

[57] ABSTRACT

A quick coupling apparatus is provided for interchanging any number of vehicle body units on a single vehicle chassis when each of the body units and the chassis has a pair of parallel longitudinal standardly spaced beams whereby the beams of the body unit will overlie and be supported by the chassis beams when the components are coupled. The coupling apparatus has a plurality of hook-type tabs spacedly positioned on the sides of the body beams and a corresponding number of coupling brackets mounted on the sides of the chassis beams. Each of the coupling brackets being capable of receiving a tab and securing the body unit to the chassis when the body is moved slightly in a longitudinal coupling direction. At least one of the coupling brackets having an enclosing outer plate which forms a retaining slot which can receive a wedge behind the tab for locking the tab and body in position with respect to the chassis. The wedge includes an additional latch device for releasably retaining the wedge in locking position during use of the coupled body unit. The mating angles of the tab and bracket contacting surfaces and the wedge and bracket contacting surfaces have been found to be important to the proper operation of the assembly.

7 Claims, 9 Drawing Figures

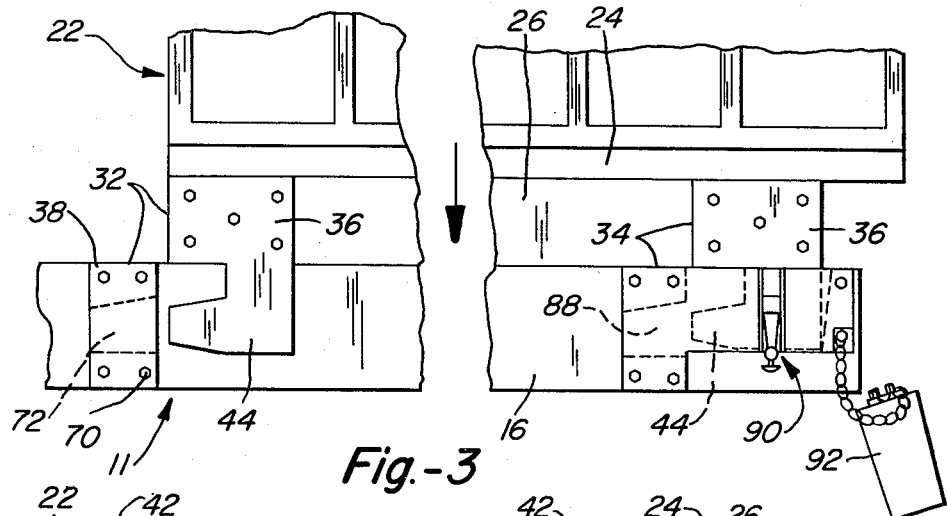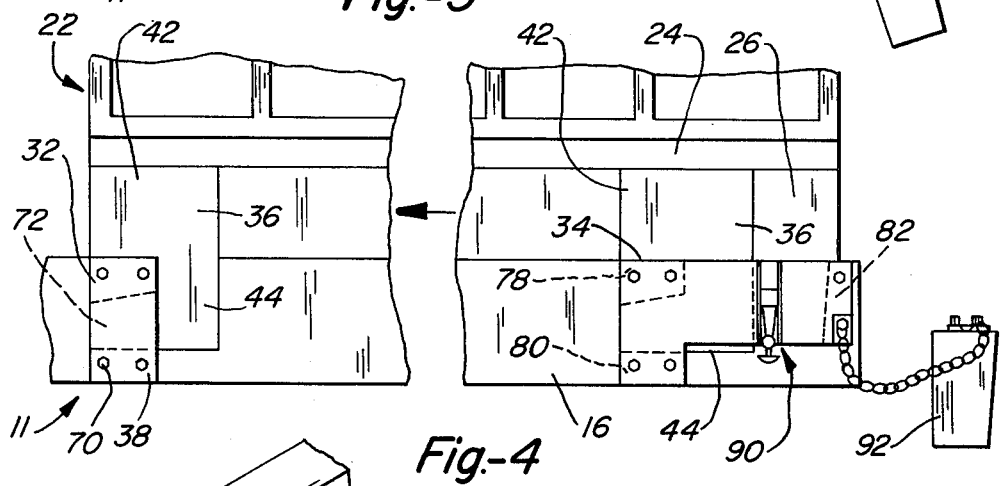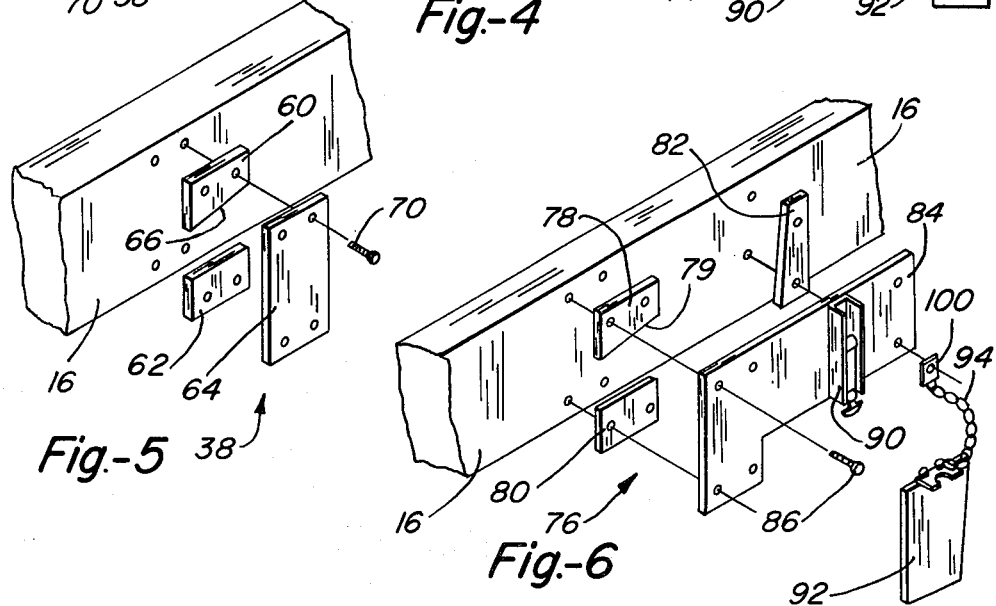

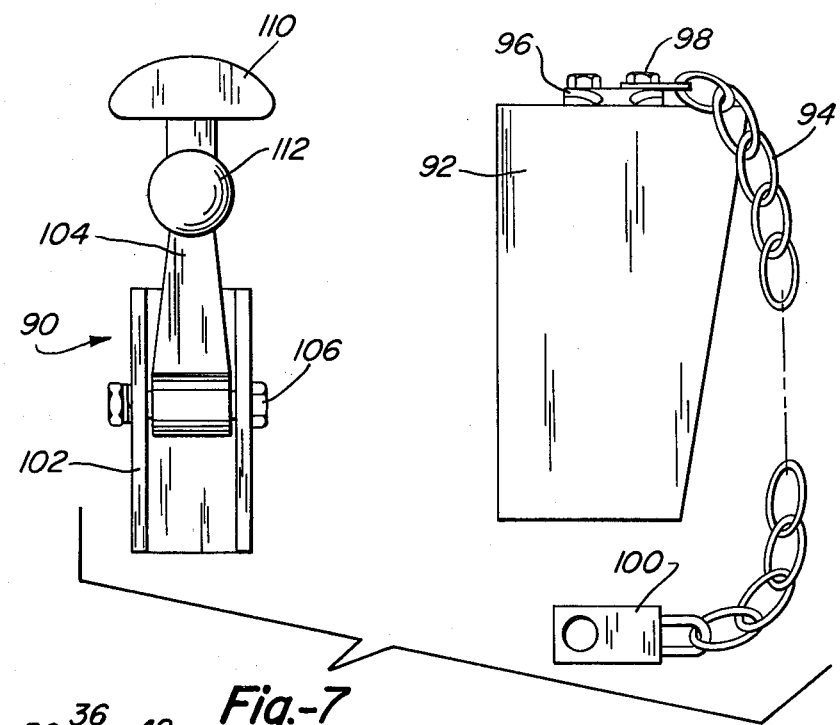
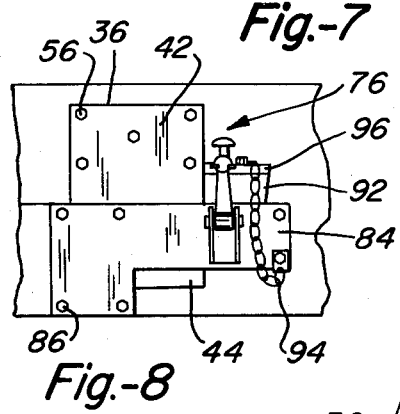
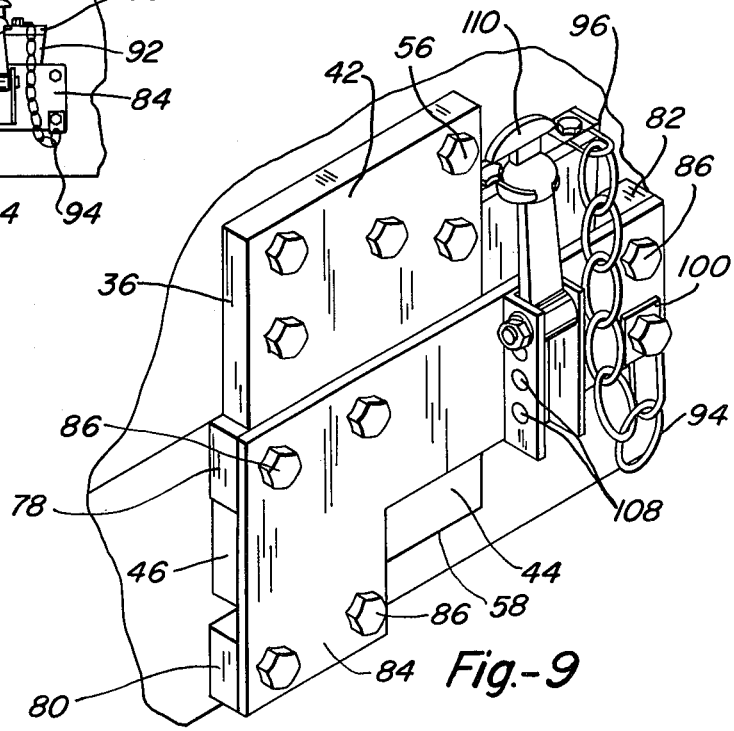

QUICK COUPLING APPARATUS FOR INTERCHANGEABLE TRUCK BODIES

FIELD OF THE INVENTION

The present invention is directed to a quick release coupling apparatus for rapidly interchanging the body units on a truck chassis. It is more specifically directed to a plurality of tabs mounted on the truck bodies and arranged to interfit and lock with brackets mounted on the truck chassis.

BACKGROUND OF THE INVENTION

In the past, several attempts have been made to provide a method of quickly interchanging various body configurations on a single standard truck chassis. As is well known the majority of the cost of a truck vehicle lies in the heavy duty truck chassis which includes tires, cab, engine, transmission, and drive train for propelling the vehicle.

Most trucks when they are purchased include only a single body originally mounted on the chassis and capable of performing usually only a single function. This arrangement greatly restricts the utility of the vehicle and limits it solely to the capability provided by the selected body. Thus, a truck chassis having a dump body is limited solely to the carrying of bulk materials and the dumping of these materials at the receiving site. In a similar manner, an enclosed truck body is solely capable of transporting cargo from one point to another. By the same token an enclosed tank body greatly limits that vehicle to the hauling of liquids with no other utility available.

It has been well known in the past that greater efficiencies can be obtained with a corresponding decrease in overall cost if a truck chassis can be used for different types of utility functions. This is to say that if various types of truck bodies can be quickly and easily interchanged on a single vehicle chassis the usefulness of the vehicle can be greatly expanded with a corresponding decrease in overall cost expenditures. In addition, the cost for maintenance of the vehicle fleet can be reduced due to the fact that the bodies can be removed from the chassis and repaired or maintained while the chassis continues to perform other functions.

Although the desirability of being able to interchange bodies on a single truck chassis has been well known in the past, no one has been able to provide a suitable apparatus for actually permitting the quick changing of the bodies and yet provide a completely secure and safe coupling arrangement. Many of the systems which have been devised have been expensive and complicated and have utilizied various guide rails and pivoting arrangements with the addition of hydraulic clamps to rigidly secure the body to the chassis. As can be readily seen, this is a rather costly way of performing this process especially if a hydraulic power unit is not already available on the truck chassis.

Even on smaller vehicles such as campers where the body is installed and removed quite often various arrangements have been attempted to secure the body to the chassis of the vehicle. These methods have included the use of bolts or turnbuckles and cables to secure the units. The present invention is intended to eliminate all of these complex arrangements which have been suggested in the past and provide an apparatus which is extremely simple to use and yet extremely rugged and safe for the attachment of the body to the truck chassis.

The present apparatus is also intended to allow the body to be quickly removed in a matter of minutes and the installation of a replacement body in an equal amount of time. In addition, the present invention can also allow the same truck chassis to be used as a tractor by the installation of a fifth-wheel assembly for use with various types of semi-trailers. This same quick-coupling arrangement also allows the truck chassis to be used with self-contained power units to perform other useful functions such as a backhoe digging or well drilling operations. Thus, as can be easily seen, the present invention will permit the usefulness of a single truck chassis to be greatly increased and made universal.

PRIOR ART STATEMENT

The following described prior art patents are believed to be pertinent to the type of invention which is presented herein.

The patent to Neff (U.S. Pat. No. 1,547,516) is directed to a toy vehicle which has various interchangeable bodies. The bodies are attached to the base portion of the vehicle by the insertion of a rounded tab into a corresponding slot in the base of the vehicle. A bolt is provided for clamping the body to the base after the tabs are inserted.

The Ezolt patent (U.S. Pat. No. 3,450,282) shows an arrangement for a slidable and tiltable truck bed. A pivoting arm attached to the front portion of the bed guides the bed into proper position on the truck chassis. A system of beams and rollers on the rear portion of the chassis allows the bed to slide easily onto the chassis.

The patent to Balasingame (U.S. Pat. No. 4,000,924) discloses a demountable body unit frame for supporting a variety of commercial equipment units. These units are intended for use on a motor truck chassis. The frame includes spaced longitudinal frame structural members which are attached to the truck chassis by means of a number of pivotable coupling devices. Outrigger type landing gear devices are mounted on the frame for temporarily supporting the frame when it is not mounted on the truck chassis.

The patent to Thomas B. Dalton, et al. (U.S. Pat. No. 4,071,274) reveals a pivotal and removable truck body which is arranged for mounting on a truck chassis. The system provides a plurality of guide members secured on the chassis which mate with guide members provided on the truck body. Latches lock the body in place once the body has reached its lowermost position.

SUMMARY OF THE INVENTION

This invention is directed to a novel coupling assembly which is provided for quickly attaching or detaching a number of truck body units on the chassis of a truck vehicle. All truck chassis have a pair of spaced, parallel channels or beams which run longitudinally along the vehicle and form the main structure for the vehicle itself. Most manufacturers have standardized on a set dimension of approximately 34 inches for the spacing between these beams.

In the same way, the truck body manufacturers, who are usually separate and independent of the chassis manufacturer, provide a number of longitudinal and transverse beams which make up the base structure for the body unit. This base structure is mounted on a separate pair of longitudinally arranged, parallel channels or beams which are spaced to correspond with the standard dimension of the chassis beams. During normal assembly of a truck body to the chassis these longitudinal beams are usually bolted or riveted together by means of a plurality of gusset plates spacedly arranged along the outside surfaces of the beams.

Because of the fact that it would be extremely difficult and time consuming to remove the bolts or rivets holding the beams together it is usually impractical to change the function of the truck assembly from one body use to another.

In the present invention a standarized assembly is provided for replacing the attaching gussets with a number of quick change couplings for universally mounting the body unit to the standard chassis.

In this invention a number of tabs having a forwardly directed hook are rigidly attached to the sides of the body frame beams. A number of corresponding brackets are rigidly attached to the surfaces of the chassis beams and arranged to correspond with the positioning of the body tabs. These brackets have a receiving slot so that once the body is positioned on the chassis it is moved longitudinally a short distance by any method available such as a cable winch, a fork lift vehicle or by backing the body against a solid surface. In this way the hooks slidably engage the brackets so as to clamp the body into position on the chassis. In many cases a pair of coupling brackets are provided at the front portion of the chassis and a second pair at the rear portion. Additional brackets can be provided usually in pairs spaced along the length of the chassis to provide additional functions or receiving bodies having different lengths or a fifth-wheel assembly.

One pair or possibly all of the brackets can include an outer cover plate extension which essentially provides a slotted channel along the side of the chassis for the reception of the hooked tab. The end of the slotted bracket opposite the hook receptacle includes a channel for the insertion of a wedge for securing the tab in its locked position. A resilient latch is provided on the bracket for engaging the wedge to retain it in position so that it can not be loosened during use. In this way, all of the couplings are locked in position and provide a rigid attachment for the body frame to the chassis.

The body tabs are arranged to have a flat bottom surface so that the body when removed can be easily supported on a rigid surface by resting on the projecting tabs. In addition, the hooked portion of these tabs have a downwardly angled forward surface which is provided for engaging a correspondingly angled surface provided in the chassis bracket. In this way the body structure is tightened against the chassis structure during coupling. The angle of this surface must be within the range of 13-23° in order to prevent the body from being frozen or clamped to the chassis in such a manner that it would be difficult if not impossible to slidably disengage the tab from the receptacle in order to remove the body. By the same token it has been found that it is necessary to provide a shallow angle on the corresponding surface at the back of the coupling as well as the wedge surface at the back of the slotted receptacle to allow the wedge to tighten the tab and frictionally hold it in place. This angle must be within the range of 7-10° with 10° being the maximum that can be permitted.

Through tests and operation of the coupling arrangement provided according to the present invention, the angles which have been stated herein have been found to be critical to the successful operation of the coupling device and therefore form an important part of this invention. It is to be understood that the materials provided in the construction of the brackets and tabs provided in this invention can be of any suitable material such as T1 type steel. The most important consideration is that the material has sufficient strength to withstand the stresses transferred to the tab and bracket by the loads placed on the body frame during use.

If aluminum beams or channels are used in the body frame or in the truck chassis beams a neoprene coating should be applied between the beams so that the abrasion between any dissimilar metals between the body or chassis beams will be eliminated. This is necessary to prevent galling between the parts with the possibility of the beams being fused together.

Any number of tab and bracket couplings can be provided on each side of the chassis and body frame with the intent that if possible the positioning of the chassis brackets will be arranged at standard distances so that the tabs mounted on the body frames will easily interfit with the standard bracket positions making a universal operation. It is anticipated that at least four brackets will be provided on each side of the chassis with the middle two pair of brackets being properly positioned with respect to the rear wheels of the vehicle for support of a fifth wheel suspension. The positioning of these brackets is important from the standpoint of balancing the load with respect to the traction wheels for proper truck operation.

Other features and advantages of the present invention will become apparent from the following detailed description of the invention when it is considered in conjunction with the accompanying drawings.

BRIEF DESCRIPTION OF THE DRAWINGS

FIG. 3 is a partial side elevation view of the coupling apparatus with the body and chassis beams engaged;

FIG. 4 is a partial side elevation view showing the body frame moved longitudinally foward with respect to the chassis so that the hooked tabs engage the receptacles;

FIG. 5 is an exploded perspective view showing the individual parts of the open chassis receptacle bracket;

FIG. 6 is an exploded perspective view of the elements which make up the closed chassis receptacle bracket;

FIG. 7 is a side elevation view showing the individual locking wedge and latch;

FIG. 8 is a side elevation view showing the coupling engaged with the locking wedge in place and retained; and FIG. 9 is an enlarged perspective view of the coupling shown in FIG. 8 showing the latch engaged to retain the wedge in place.

DETAILED DESCRIPTION OF THE INVENTION

Figure 1:
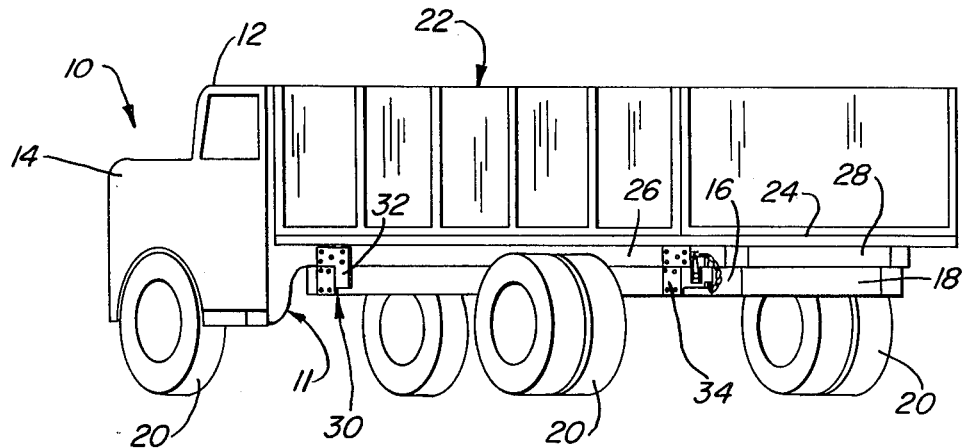
FIG. 1 is a perspective view of a truck type vehicle with the quick coupling apparatus according to the present invention installed.

Turning now more specifically to the drawings, FIG. 1 shows a truck type vehicle 10, having a cab 12, engine cowling 14, spaced longitudinal chassis beams 16, 18 and wheels and tires 20. A body portion 22 having a structural frame 24 which is mounted on a pair of longitudinal support beams 26, 28 is arranged to be mounted on the truck chassis beams 16, 18, respectively.

The truck chassis beams 16, 18 are arranged longitudinally along the truck tractor portion and form the basic support structure for the cab, engine, drive train and wheels to form a basic vehicle. These beams are arranged parallel and spaced transversely according to a standard distance which has been accepted in the industry. In the same light, the body support beams 26, 28 are also arranged parallel to each other and longitudinal of the body unit. These beams are spaced an equal distance which corresponds with the standard dimension of the truck chassis beams.

It is to be understood that one of the primary purposes of this invention is that the body unit 22 can be of any type desired to perform the intended mobile function. This is to say that the body 22 including its frame structure can perform the function of a flat bed trailer, enclosed truck body, tank body container, truck dump bed, or the body structure can have equipment thereon such as a power generator unit, well drilling apparatus, garbage or trash hauling and compacting enclosure, vehicle carrier, cement mixing apparatus or any other special body useful for performing a specific desired task or function. It is to be understood that any of these bodies can be interchanged on a single truck chassis 11 at any time that it is desired to change the function of the vehicle.

The quick change coupling assembly 30 according to the present invention includes an open type coupler 32 and a closed coupler 34. By use of these special couplers it is possible to interchange the body units quickly and easily so that any type of body unit can be mounted or removed from the universal truck chassis 11.

The open type coupler 32 includes a coupling tab 36 having a mounting portion 42 and a downwardly extending hook portion 44. The hook portion 44 has an end portion 46 which is formed by edges 48 and 50 which converge toward each other. The edge 48 slopes downwardly forming an angle A with a line parallel to the surface 52 of the mounting portion 42. The interceding edge 54 can be arranged perpendicular from the surface 52, if desired. The dimension between the surface 52 and the starting point of surface 48 where it intersects the edge 54 is critical to the proper operation of the coupling. The mounting portion 42 of the tab 36 is rigidly attached to the body beam 26 by means of suitable fasteners such as bolts or rivets 56. In order to provide the correct tab distances below the beam it is desirable to mount the surface 52 flush with the bottom edge of the beam 26 so that other dimensions in the coupling will be correct. It is also possible that horizontal slots can be provided in the mounting portion 42 to allow the tab to be adjusted longitudinally with respect to the body beam 26. This will allow adjustment of the position of the tab with respect to the chassis brackets. It is also possible to provide a flat edge 58 on the bottom of the tab 36 so that when the body 22 is removed from the chassis it can rest easily on any flat, rigid, storage surface.

It is to be understood that the same body tab 36 as described herein is used in all of the coupling assemblies provided in this invention. It is possible, however, that some of the dimensions or angles on the tab can be varied to provide different locking or fit arrangements. Throughout the description, however, the tabs utilized will be illustrated as being the same and the same identification numbers will be used for these parts.

The primary difference between the open and closed couplers is found in the bracket elements. The open bracket receptacles are formed by upper spacer block 60, bottom spacer 62 and cover 64. These elements are assembled into a receptacle bracket 38 as shown in FIG. 5 by fasteners such as bolts or rivets 70. As can be seen as these parts are assembled to the side of the chassis beam 16 an enclosed receptacle 72 is formed between the spacer blocks and the cover plate. The top surface of the block 60 is intended to be mounted approximately one inch below the top surface of the beam 16. At the same time the depth of the block from the top surface to the angled surface 66 is slightly greater than the dimension of the surface 54 in the hook portion 44 of the tab 36. The reason for this is to allow the surfaces 48 and 66 to contact prior to the actual contact of the surface 54 with the spacer block 60. In this way a tightening force is assured between the tab 36 and the bracket 38. It is proposed that the front pair of the brackets on each side of the truck chassis beams 16, 18 can be of the open coupling type 32.

Figure 2:
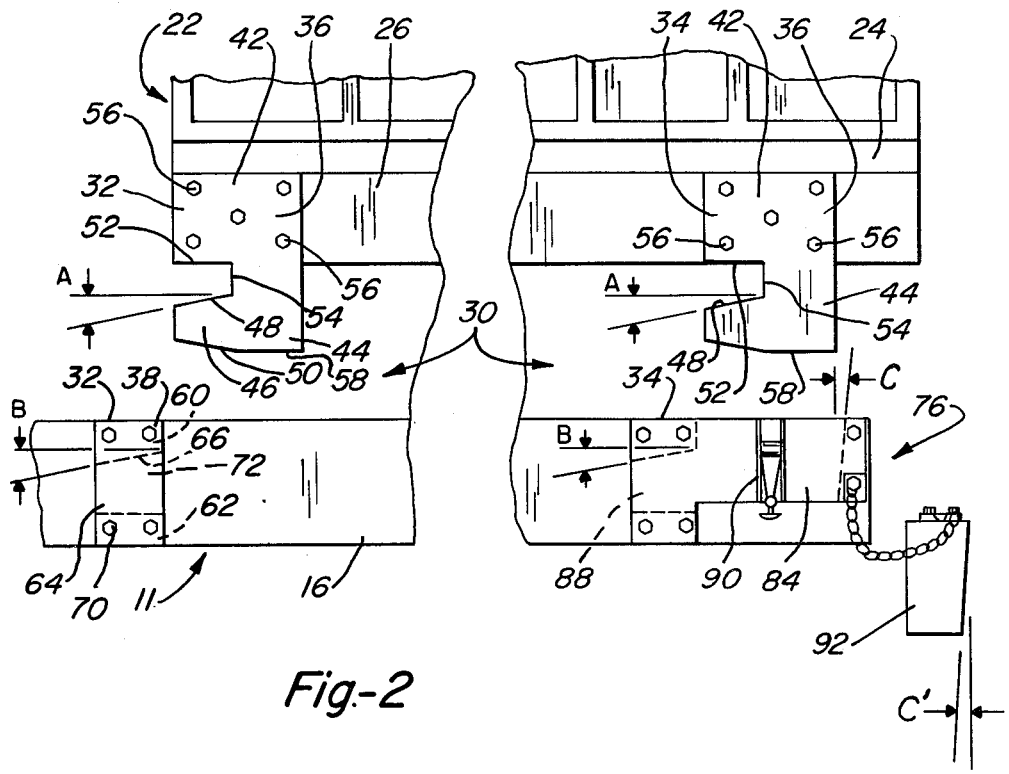
FIG. 2 is a partial side elevation view of the coupling apparatus prior to the elements being engaged.

The closed bracket 76 forms a slotted receptacle for the closed coupler 34. Closed bracket 76 includes upper spacer block 78 and lower spacer 80. These spacers are similar to the spacers 60, 62. In addition to the spacers 78, 80 are the wedge block 82 and the outer cover plate 84. Suitable fasteners such as bolts or rivets 86 are used to secure the cover plate and spacers to the chassis beam 16 as shown in FIG. 6. With the components mounted on the side of the chassis beam a slotted receptacle 88 is formed between the cover plate 84 and the beam 16. A considerable gap is provided between the spacer block 78 and the wedge block 82 to allow the insertion of the hook portion 44 of the tab 36. As explained before once the tab 36 has been inserted into the receptacle 88 and moved forward with respect to the beam 16 the end 46 of the hook portion 44 moves into the space between the spacer blocks 78 and 80. The upper spacer block 78 has a downwardly angled bottom surface 79 which mates with the angled surface 48 on the hooked tab 44. The angle of the surface 79 is identified as angle B in FIG. 2. This angle ranges between 13° and 23° with 23° being the maximum allowable. Any angle less that 13° may allow the parts to freeze together making it impossible to remove the body from the chassis. At the same time any angle greater than 23° has been found to prevent the proper force from being applied to the tabs and, thus, produce insufficient friction in the mating surfaces to prevent the parts from loosening. In most cases, it is intended that angles A and B will be the same in each respective coupler.

In order to further lock the couplings in position during use a wedge 92 is positioned behind the tab 36 once the tab and brackets have been engaged. The forward surface on the wedge block 82 is angled as identified by angle C in FIG. 2 at an angle within the range of 7° to 10°. This shallow angle is required to allow sufficient friction to be maintained between the contact surfaces of the wedge 92 and the wedge block 82 to retain the wedge in locked position. In addition, the shallow angle allows a considerable force to be applied to retain the hooked tab 44 within the receptacle formed by the spacer blocks. The wedge 92 includes a retainer chain attached to one of the bolts 86 by means of a clip 100. The upper portion of the chain is welded to a catch plate 96 which is fastened to the upper surface of the wedge by fasteners such as bolts 98.

The angled surface of the wedge 92 is preferably positioned towards the rear of the vehicle and so consequently, if the wedge is used on the opposite side of the vehicle from that illustrated the catch plate 96 is removed and reversed to position the catch away from the chassis beam 16.

In order to be certain that the wedge will remain in locked position a resilient retainer 90 is mounted on the outer surface of the cover plate 84. The retainer 90 includes a channel 102 having a number of horizontally aligned adjustment holes 108 which are provided along the sides of the channel 102. A resilient latch 104 is connected to the channel 102 by a bolt or pin 106 positioned through the proper adjustment holes 108. The latch 104 is fabricated from a resilient material such as synthetic rubber and has a spherical body 112 and an easily gripped handle 110. Once the wedge 92 is securely positioned behind the hooked tab 44 the handle 110 is pulled to stretch the latch 104 so that the spherical portion 112 can be positioned in the catch 96. In this manner, the wedge is securely retained in its locking position so that vibrations and movement between the body unit and the chassis will not loosen the wedge and allow it to back out.

As previously mentioned the quick change coupling apparatus according to the present invention can utilize any number of tabs and opened or closed brackets as desired to perform the desired attachment function. In most cases it is anticipated that the open coupling brackets will be utilized on the forward portion of the chassis beams while the closed brackets will be utilized in the rear or middle portions. When it is desired to attach a fifth wheel assembly to the chassis, four tabs positioned at each corner of the fifth wheel assembly can be mated with four closed coupler brackets mounted on the chassis beams. By the same token any tab and bracket arrangement, so long as one closed bracket is utilized, can be provided depending upon the body unit which will be connected.

In most cases it is desirable to standardize the location and spacing of the tabs and brackets on the body and chassis beams. Thus, it is anticipated that four tabs at least will be mounted on each of the body units and suitable brackets will be positioned to receive these tabs on the chassis beams. In order to accommodate body units of various lengths it is anticipated that three or four brackets can be spacedly positioned at standard locations along the side of the chassis beams.

In the same manner which has been described herein it is also possible to use a light weight type of coupling assembly similar to that which has been described herein for smaller capacity truck vehicles such as pickup trucks. In this way pickup trucks of one-half or three-quarter ton capacity can be quick-changed to allow the mounting of a camper body, a light hauling bed or even a pivotal light weight dump bed. It is to be understood that the interchangeable quick coupling apparatus as described herein can be used on any vehicle including railroad vehicles where it is desirable to interchange the body or load carrying units and thus the function of a single, self-powered or towed vehicle.

While an improved interchangeable quick-coupling apparatus has been shown and described in detail in this application, it is to be understood that this invention is not to be considered to be limited to the exact form disclosed and changes in the detail and construction of the invention may be made without departing from the spirit thereof.

What is claimed is:

1. A quick coupling apparatus for interchanging a number of vehicle body units on a single universal vehicle chassis, the vehicle body units and vehicle chassis each having a pair of parallel, longitudinal beams with each pair of beams spaced a standard distance so that the body unit beams will overlie and be supported on the chassis beams when they are coupled, a quick coupling apparatus comprising;
   (a) one or more tab means being mounted on the side surface of a body beam and arranged and positioned to extend below said body beam;
   (b) one or more coupling bracket means mounted on the side of the chassis beam in a position which coincides with the position of a corresponding body tab means, said coupling bracket means includes one or more spacer blocks and an outer cover plate which is arranged parallel to the surface of the beam on which it is mounted which defines a receptical means, such spacer blocks having a thickness which is slightly greater than the thickness of said tab means whereby the tab means will easily interfit with the coupling bracket means;
   (c) said tab means having a longitudinally projecting hook portion said receptical means when the body means is moved in a longitudinal coupling direction where said tab means and bracket means couple to securely retain the body unit in proper position on the vehicle chassis during use;
   (d) said body tab means and said coupling bracket means have a respective contact mating surface, the contacting surface between said tab means and bracket means forming a shallow angle with respect to the contact surface between the body unit beams and chassis beams whereby as the tab means is caused to forcibly engage with the bracket means the angle of the surfaces will cause a considerable force to be applied between the body and chassis beams to rigidly hold these beams in relative position during use;
   (e) in at least one of said coupling bracket means said outer cover plate is elongated and arranged parallel to the mounting beam, a bracket wedge is positioned at one end of said elongated cover plate between said cover plate and said beam so that an elongated enclosed slot is formed between the spacer blocks and the bracket wedge;
   (f) a wedge locking plate arranged to securely lock the tab and bracket means in engaged position;
   (g) said enclosed slot being arranged to have sufficient length after said tab means and bracket means are engaged for receiving the wedge plate adjacent to said tab means to self-lock the wedge plate by friction to retain the tab means in the coupled position during use; and
   (h) said wedge plate having opposed elongated sides with one side forming a slightly tapered shallow angle with respect to the other, the bracket wedge contacting surface being arranged at a corresponding angle of between 7° to 10° with respect to a perpendicular line from a plane through the unit and chassis beam contact surface which permits the wedge plate when inserted to forcibly tighten the tab and bracket contacting surface while at the same time tightening the wedge plate against the bracket wedge to securely lock the wedge plate in position by friction caused by the forces produced in the angled contacting surfaces.

2. A quick coupling apparatus as defined in claim 1 wherein the angle of the contacting surfaces of the bracket and tab means lies within the range of 13° to 23°.

3. A quick coupling apparatus as defined in claim 1 wherein said tab means are mounted on the outer surface of said body beams and said chassis bracket means are mounted on the outer surface of said chassis beams and in position to couple with the said body tab means.

4. A quick coupling apparatus as defined in claim 1 wherein said body tab means are arranged in pairs aligned transverse on each side of the body beams and a plurality of pairs of chassis bracket means are provided in corresponding spaced relation on said chassis beams.

5. A quick coupling apparatus as defined in claim 1 which further includes a latch means for securing the wedge plate in its locking position during use.

6. A quick coupling apparatus as defined in claim 1 wherein the angle of the contact surface between the wedge plate and the bracket means angles away from the tab means at the end which is closest to the contact surface between the beams so that the wedge plate when inserted to the locking position is inserted through the opening of the enclosed slot closest to the beam contacting surface.

7. A quick coupling apparatus as defined in claim 1 wherein the tab means are mounted to the sides of the body onto beams and are arranged to all extend an equal distance below the body beams to support the body unit on a suitable surface when not in use.

* * * * *